(12) United States Patent
Lasko

(10) Patent No.: US 11,120,677 B2
(45) Date of Patent: Sep. 14, 2021

(54) TRANSCODING MIXING AND DISTRIBUTION SYSTEM AND METHOD FOR A VIDEO SECURITY SYSTEM

(71) Applicant: Sensormatic Electronics, LLC, Boca Raton, FL (US)

(72) Inventor: Kim Lasko, Maynard, MA (US)

(73) Assignee: Sensormatic Electronics, LLC, Boca Raton, FL (US)

(*) Notice: Subject to any disclaimer, the term of this patent is extended or adjusted under 35 U.S.C. 154(b) by 323 days.

(21) Appl. No.: 15/972,651

(22) Filed: May 7, 2018

(65) Prior Publication Data

US 2018/0330590 A1 Nov. 15, 2018

Related U.S. Application Data

(63) Continuation of application No. 13/661,572, filed on Oct. 26, 2012, now abandoned.

(51) Int. Cl.
*G08B 13/196* (2006.01)
*H04N 7/18* (2006.01)

(52) U.S. Cl.
CPC ....... *G08B 13/19682* (2013.01); *H04N 7/181* (2013.01)

(58) Field of Classification Search
CPC .......................... G08B 13/19682; H04N 7/181
See application file for complete search history.

(56) References Cited

U.S. PATENT DOCUMENTS

| 4,814,869 A | 3/1989 | Oliver, Jr. |
| 5,040,067 A | 8/1991 | Yamazaki |
| 5,258,837 A | 11/1993 | Gormley |
| 5,512,942 A | 4/1996 | Otsuki |

(Continued)

FOREIGN PATENT DOCUMENTS

EP 1 655 962 5/2006
WO WO-2012002896 A1 * 1/2012 ............. H04N 5/262

OTHER PUBLICATIONS

Kim et al. "Distributed Video Transcoding System for 8K 360° VR Tiled Streaming Service" IEEE ICTC 2018 (Year: 2018).*

(Continued)

*Primary Examiner* — Richard A Hansell, Jr.
(74) *Attorney, Agent, or Firm* — HoustonHogle LLP

(57) ABSTRACT

A system and method for transcoding and mixing of video data in a security video distribution system for a video security system in response to selection of video data. User devices such as mobile user devices can select displayed video data streams sent from the video security system and create new views of the selected video data streams without the prior steps of configuring and pushing new views from a server within the system. At the time of selection, user devices can specify operations to perform on the selected video data, such as zoom and combine. In a preferred embodiment, transcoding and mixing of video data streams within the security video distribution system utilizes shared memory between processes. This has advantages not only in equipment cost savings and efficiency, but also provides for real-time collaboration and sharing of video content in a video security system using mobile user devices.

18 Claims, 9 Drawing Sheets

(56) References Cited

U.S. PATENT DOCUMENTS

| | | | |
|---|---|---|---|
| 6,108,584 A * | 8/2000 | Edwards | H04S 1/007 |
| | | | 381/22 |
| 6,462,774 B1 | 10/2002 | Bildstein | |
| 6,493,873 B1 | 12/2002 | Williams | |
| 6,507,672 B1 | 1/2003 | Watkins | |
| 6,567,984 B1 | 5/2003 | Allport | |
| 6,908,385 B2 | 6/2005 | Green | |
| 7,295,228 B2 | 11/2007 | Roberts et al. | |
| 9,762,860 B2 * | 9/2017 | Lagardere | H04N 21/23412 |
| 2002/0097322 A1 * | 7/2002 | Monroe | H04N 5/23206 |
| | | | 348/159 |
| 2003/0193577 A1 | 10/2003 | Doring et al. | |
| 2004/0075741 A1 | 4/2004 | Berkey et al. | |
| 2004/0163118 A1 | 8/2004 | Mottur | |
| 2004/0233983 A1 | 11/2004 | Crawford et al. | |
| 2005/0008240 A1 | 1/2005 | Banerji et al. | |
| 2007/0024706 A1 | 2/2007 | Brannon, Jr. et al. | |
| 2007/0070185 A1 | 3/2007 | Dy et al. | |
| 2008/0055470 A1 | 3/2008 | Garg et al. | |
| 2008/0158336 A1 * | 7/2008 | Benson | H04L 65/602 |
| | | | 348/14.08 |
| 2009/0262206 A1 | 10/2009 | Park | |
| 2010/0033621 A1 | 2/2010 | Change et al. | |
| 2010/0066836 A1 * | 3/2010 | Nakamura | H04N 21/6587 |
| | | | 348/159 |
| 2010/0303145 A1 * | 12/2010 | Nambiath | H04N 21/4882 |
| | | | 375/240.01 |
| 2010/0303436 A1 | 12/2010 | Chang et al. | |
| 2011/0052069 A1 * | 3/2011 | Nakabayashi | G11B 27/105 |
| | | | 382/190 |
| 2011/0080425 A1 | 4/2011 | Kim et al. | |
| 2011/0119716 A1 * | 5/2011 | Coleman, Sr. | H04N 7/181 |
| | | | 725/62 |
| 2011/0200093 A1 | 8/2011 | Gabara et al. | |
| 2011/0292057 A1 * | 12/2011 | Schmit | G06F 9/5044 |
| | | | 345/520 |
| 2013/0152153 A1 * | 6/2013 | Weiser | H04L 65/1006 |
| | | | 726/1 |
| 2013/0222601 A1 * | 8/2013 | Engstrom | H04N 5/265 |
| | | | 348/159 |
| 2013/0307971 A1 * | 11/2013 | Ganesan | H04N 21/21805 |
| | | | 348/143 |
| 2014/0241703 A1 * | 8/2014 | Hwang | H04N 5/772 |
| | | | 386/327 |
| 2019/0253640 A1 * | 8/2019 | Nakamura | H04N 5/265 |

OTHER PUBLICATIONS

Baskaran et al. "Design and implementation of parallel video combiner architecture for multi-user video conferencing at ultra-high definition resolution", Multimed Tools Appl (2015) 74:6589-6622 DOI 10.1007/s11042-042-014-1907-4 (Year: 2015).*

Cucchiara, R., et al. "A multi-camera vision system for fall detection and alarm generation," Expert Systems, 24(5): 334-345 (2007).

International Preliminary Report on Patentability, dated May 7, 2015, from counterpart International Application No. PCT/US2013/051700, filed Jul. 23, 2013.

International Search Report and Written Opinion of the International Searching Authority dated Nov. 7, 2013, from counterpart International Application No. PCT /US2013/051700, filed Jul. 23, 2013.

Li, C-H., H. Lin, C-N. Wang and T. Chiang "A Fast H.264-Based Picture-In-Picture (PIP) Transcoder", IEEE International Conference on Multimedia and E.

* cited by examiner

TRANSCODING MIXING AND DISTRIBUTION SYSTEM AND METHOD FOR A VIDEO SECURITY SYSTEM

RELATED APPLICATIONS

This application is a Continuation of U.S. patent application Ser. No. 13/661,572, filed on Oct. 26, 2012, which is incorporated herein by reference in its entirety.

BACKGROUND OF THE INVENTION

Video security systems include security cameras and concurrently present video data streams for simultaneous observation on such devices as dedicated displays or computer workstation displays. Often individual panes within a matrix view can be selected and expanded to extend over the entire area of the displays.

Typically, video data streams from each of the security cameras is combined into the matrix using mixers that combine the video data streams from the security cameras. This matrix can then be sent directly to the displays or streamed to user devices over a network to mobile devices. In fact, some of these systems enable the video data streams to be controlled at the mobile user devices.

These video security systems allow users on the user devices to select one or more of the displayed video data streams to create auxiliary views of interest beyond the standard matrix view of the video data streams from each video camera. These video security systems typically require the installation of custom software on a view server that pushes predefined views to mobile and non-mobile user devices. These predefined views occupy fixed regions on the displays of the user devices. Once the user has configured the views on the view server, the user devices can then access and display the video data streams in these views.

SUMMARY OF THE INVENTION

One of the problems with current video security systems is that the creation of new views of displayed video data streams requires multiple configuration steps. On the video stream manager device, the user selects the video data streams to mix and encode for display on the new view. On the view server, the user creates the new view and selects the video data streams for display on the new view. User devices can then display the new view of video data streams. These different actions add equipment costs, time delays, and require coordination of steps.

The present invention overcomes this problem by providing a security video distribution system for a video security system that allows user devices such as mobile user devices to select displayed video data from security cameras, create new views containing the selected video data, and program the security video distribution system to perform mixing and transcoding of the selected video data streams in response to the selection. In one example, the transcoding and mixing uses shared memory buffers, which provide more flexibility and robustness when performing operations upon video data streams at different frame rates and resolutions. Mixers can read those shared memory buffers, resize the video if necessary, change the color space if necessary, then write the result to parts of the memory buffer. Then encoders read the shared memory buffer.

This has advantages in ease of configuration and lower cost. Moreover, once a user device creates a new view of selected video data streams, all other user devices can access the same view. This allows first responders to accident scenes and law enforcement to create and share selected views of interest in real-time.

In general, according to one aspect, the invention features a security video distribution system for a video security system, which comprises an image processing system that performs transcoding and mixing of video data from security cameras, and an application support system that streams the mixed video data to user devices. In some cases, the image processing system further performs transcoding and mixing of image data.

In one embodiment, the application support system enables selection of the streaming video data at the user devices, and the image processing system changes the mixing of the mixed video data in response to the selection. In one implementation, the image processing system comprises a video decoder subsystem that decodes security camera video data from the security cameras, a video mixer subsystem that mixes the decoded video data into the mixed video data that includes video data from one or more of the security cameras, and a video encoder subsystem that encodes the mixed video data into encoded mixed video data for streaming to the user devices.

The application support system preferably comprises a web services component that receives messages from the user devices from the selection of the streaming video data at the user devices and an operation to perform on the selected video data, and a video streaming server that receives encoded mixed video data from the video encoder subsystem for streaming to the user devices. In another implementation, the system enables the user to perform a combined operation upon the selected video data at the user device.

In general, according to another aspect, the invention features a security video distribution method for a video security system, which comprises transcoding and mixing video data from security cameras, and streaming the mixed video data to user devices. In some cases, the invention further comprises transcoding and mixing of image data and streaming the mixed image data to user devices.

The security video distribution method preferably further comprises enabling selection of streaming video data at the user devices, and mixing the decoded video data from different security cameras in response to the selection.

The security video distribution method can further comprise receiving messages from the user devices from the selection of the streaming video data at the user devices and an operation to perform on the selected video data, communicating with a web services component, and receiving encoded mixed video data for streaming to the user devices. In another detail, the security video distribution method further comprises performing a combine operation on the selected video data.

In general, according to still another aspect, the invention features a transcode and mixing server for a security video distribution system, comprising a video decoder subsystem that decodes security camera video data from security cameras into decoded video data, a video mixer subsystem that mixes the decoded video data into mixed video data, and a video encoder subsystem that encodes the mixed video data into encoded mixed video data for streaming to user devices. In some cases, the video mixer subsystem also accepts image data.

In implementations, the video mixer subsystem receives messages from the user devices from the selection of the streaming video data at the user devices and an operation to perform on the selected video data.

The transcode and mixing server preferably further comprises a decoder mixer shared memory subsystem for buffering the decoded video data from the video decoder subsystem for the video mixer subsystem, a mixer encoder shared memory subsystem for buffering the mixed video data from the video mixer subsystem for the video encoder subsystem.

In another embodiment, the transcode and mixing server further comprises a video transfer switch for copying decoded video data for multiple user devices.

In general, according to still another aspect, the invention features a transcode and mixing method for a security video distribution system, including decoding security camera video data from security cameras into decoded video data, mixing the decoded video data into mixed video data, and encoding the mixed video data into encoded mixed video data for streaming to user devices. In some cases, the transcode and mixing method further comprises accepting image data.

In examples, the transcode and mixing method further comprises receiving messages from the user devices from the selection of the mixed video data at the user devices and an operation to perform on the selected video data, buffering the decoded video data prior to mixing, buffering the mixed video data prior to encoding, and mixing video data for different user devices.

The above and other features of the invention including various novel details of construction and combinations of parts, and other advantages, will now be more particularly be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
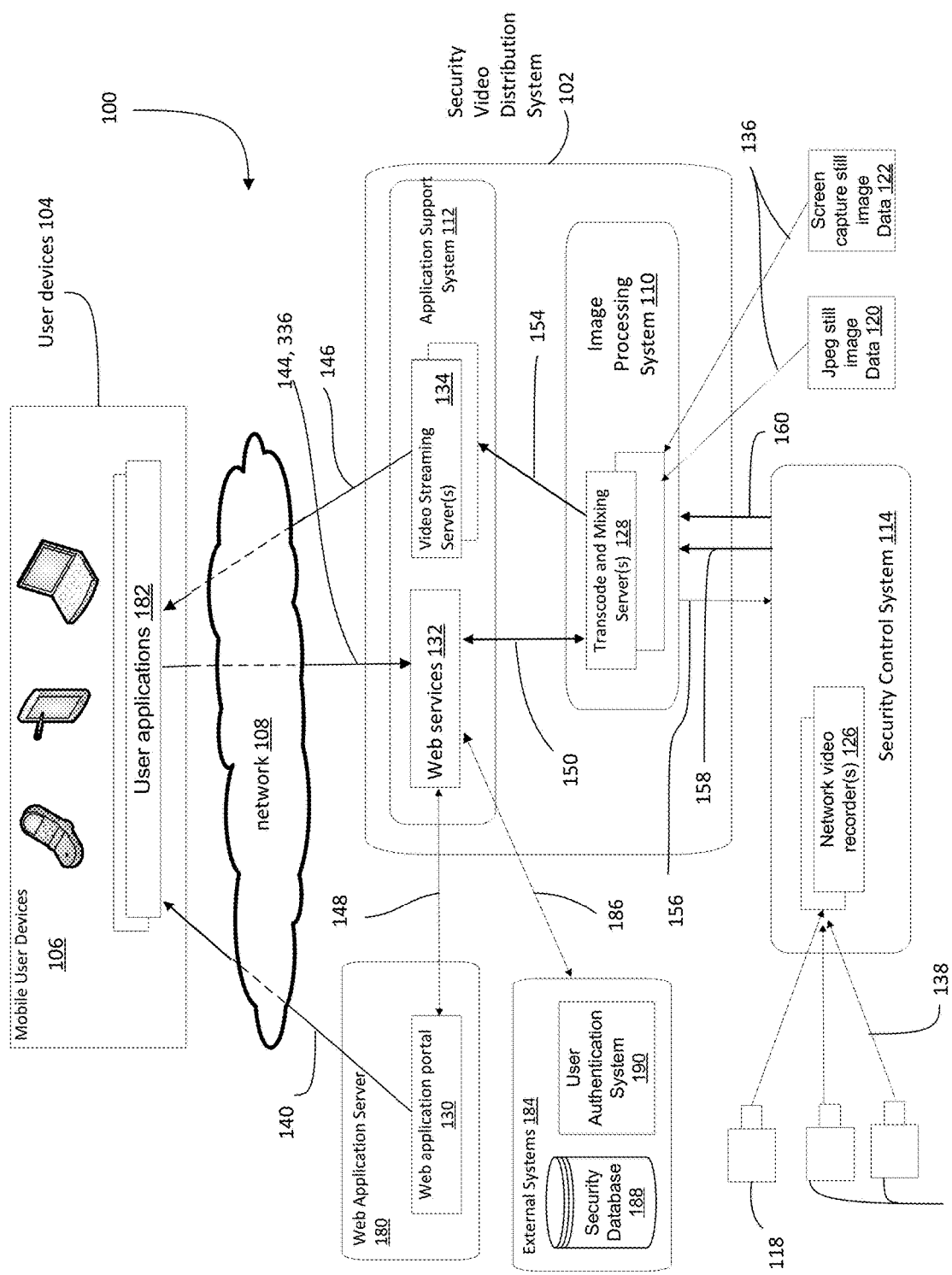
FIG. 1 is block diagram showing a video security system with a security video distribution system according to the present invention.

FIG. 1 shows a video security system 100 and a security video distribution system 102 constructed according to the principles of the present invention.

The security video distribution system 102 is comprised of an application support system 112 and an image processing system 110. The application support system 112 communicates with user devices 104 over network 108, and interfaces with the image processing system 110. The image processing system 110, in turn, interfaces with a security control system 114. The image processing system 110 further comprises one or more transcode and mixing servers 128.

The application support system 112 is further comprised of a web services component 132, and one or more video streaming servers 134. The web services component 132 of the application support system 112 interfaces with external systems 184, a web application server 180, user devices 104, and the image processing system 110. The web services component 132 provides an Application Programming Interface ("API") that interacts with components and services both internal and external to the security video distribution system 102. The video streaming server 134 accepts transcoded video data 154 sent by the image processing system 110, and transmits streaming video data 146 over the network 108 to user devices 104.

The user devices 104 such as mobile user devices 106 have user applications 182 that communicate with the security video distribution system 102 and the web application server 180 over the network 108. The network 108 can be a private or public network, and examples of supported networks include but are not limited to Local Area Networks ("LAN"), Wide Area Networks, ("WAN"), broadband networks, and the Internet/World-Wide Web.

The video streaming server 134 provides access to the transcoded video data 154 via a Universal Resource Locator ("URL") by streaming video data 146. The URL is provided by the web services 132. More specifically, using the user application 182, when the user wants to view a pre-configured video matrix view, the user selects it from a list. The user indicates "play" versus other commands like "edit". The user application calls web service to "play" the video matrix. It will get a URL from the Web Service upon call return. The web service determines if the video matrix pipeline is already running. If not it creates and starts a pipeline. It gets the URL from the pipeline and returns it to the user application. If there is failure, then there is no URL. In either case there is also a success or failure return value.

The user applications 182 can be applications native to the user devices 104, running executable code built for the user devices 104, such as web browsers that accept web page data 140, sent by a web application portal 130 of the web application server 180 over the network 108.

The security control system 114 is further comprised of one or more network video recorders 126. The network video recorders 126 receive security camera video data 138 from video data sources such as an analog security camera 118 and digital security cameras 116. While the security control system 114 primarily accepts security camera video data 138, the security control system 114 can also accept video from sources such as Internet Protocol ("IP") cameras and mobile user devices, and non-video sources such as JPEG images, screen capture image data taken from personal computers, and animated films. An example of animated films is flash animation from Adobe, Inc.

Preferably, the API presented by the web services component 132 allows the user applications 182 to upload non-video media such as image data 136 from image data sources such as JPEG still image data 120 and screen capture still image data 122 to the security video distribution system 102.

The image processing system 110 receives the image data 136 from image data sources such as the JPEG still image data 120 and the screen capture still image data 122. For communications with the security video distribution system 102, the security control system 114 receives image processing system control messages 156 from the image processing system 110, sends non-video data to the image processing system 110 via a security system data message 158, and sends video and image data via a security system media message 160. Though the security control system 114 primarily accepts security camera video data 138 from digital security cameras 116 and analog security cameras 118, the security control system 114 can also accept video data from video sources such as video capture cards and network video recorders 126 and present this as input to the image processing system 110. If the image processing system 110 accepts input from an integrated video capture card, the transcode and mixing server 128 can be configured to access graphics memory from the video capture card. In some cases, the image processing system 110 further performs transcoding and mixing of image data and other composite media such as images, text, graphics, and animation.

In one example, the user applications 182 allow the user devices 104 to display and perform operations upon streaming video data 146 sent by the security video distribution system 102. The user applications 182 allow the user to perform operations such as create, find, select, start, stop, configure, save state, and view streaming video data 146 on the user devices 104. The user applications 182 send an application control message 144 that includes the selected video data and operations to perform on the selected video data to the application support system 112. The web services component 132 receives the application control message 144, and sends a configuration control message 150 to the image processing system 110 which programs the security video distribution system 102 in response to the selection.

In another example, the web services component 132 of the security video distribution system 102 interfaces with external systems 184 via external_messages 186. The external systems 184 comprise such systems as security databases 188 and user authentication systems 190. This allows the security video distribution system 102 to provide integrated capabilities such as authentication and authorization of users, and to save information to a database. This information includes such data as status and state of security cameras, video data recorders, video data streams, and alarm history.

Figure 2:
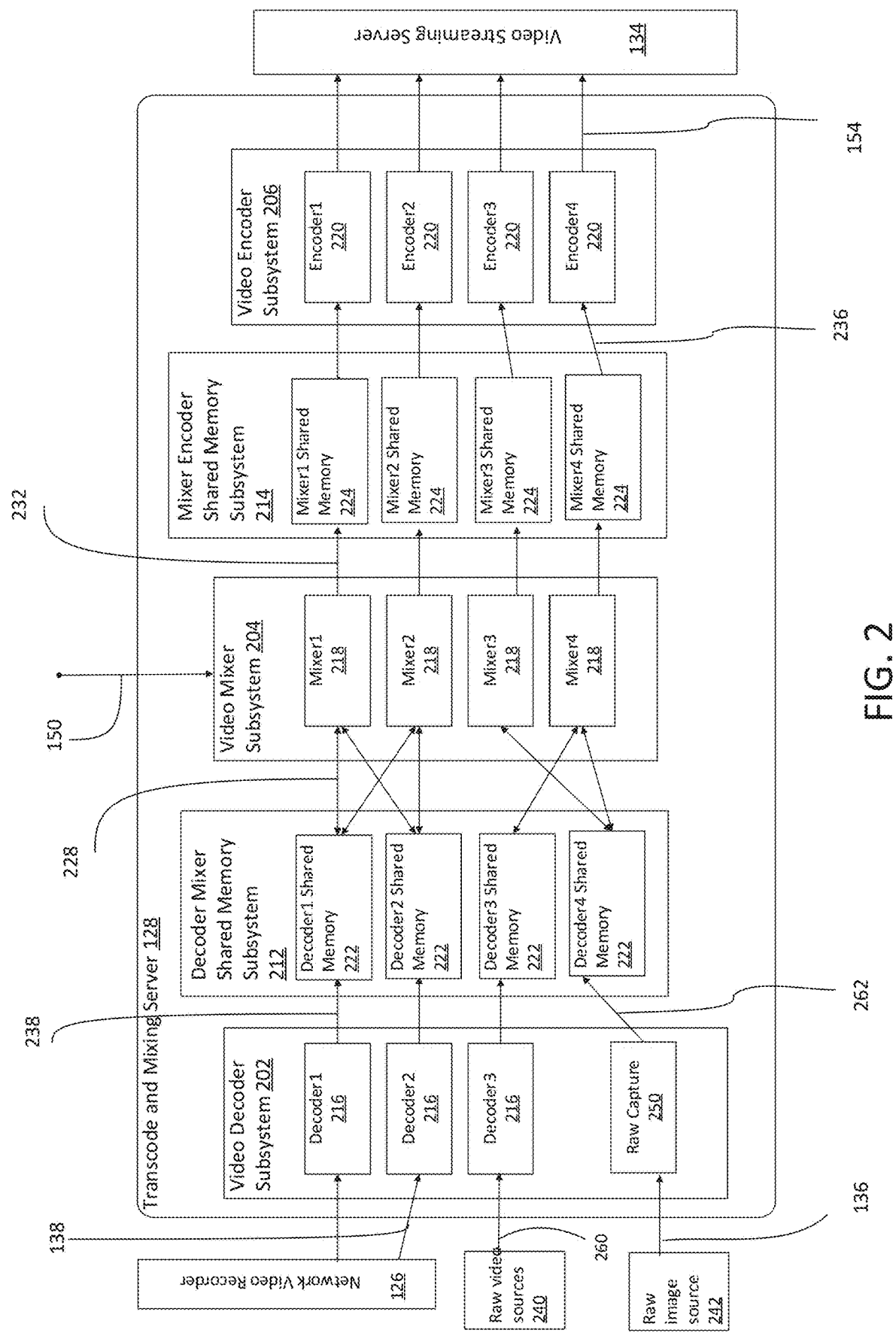
FIG. 2 is a block diagram showing a transcode and mixing server according to one embodiment of the present invention.

FIG. 2 is a block diagram showing the transcode and mixing server 128 according to one embodiment of the present invention. The transcode and mixing server 128 accepts a variety of video data streams and image data as input, performs decoding, transcoding, mixing, and encoding of the video data streams and image data, and outputs transcoded video data 154 to the video streaming server 134. Each transcoded video data stream 154 is a single encoded video data stream composed of one or more video data streams and image data decoded, mixed, and encoded by the transcode and mixing server 128. As a result, transcoded video data 154 can also be referred to as encoded mixed video data.

The video data streams and image data input to the transcode and mixing server 128 comprise raw video data 260 from raw video sources 240, security camera video data 138 from network video recorders 126, and image data 136 from raw image sources 242. Video data streams can be either compressed or raw (uncompressed) format, and image data is typically in raw format. Raw video sources 240 can include analog, composite, video from capture cards, and cable TV video. Security camera video data 138 can be encoded in different formats, such as H.264 or MPEG4, and at different frame rates, such as 15 frames per second ("fps") and 30 fps.

The transcode and mixing server 128 is comprised of a video decoder subsystem 202, a video mixer subsystem 204, and a video encoder subsystem 206. The video decoder subsystem 202 provides input to the video mixer subsystem 204, which in turn provides input to the video encoder subsystem 206. In one case, the video decoder subsystem 206 is comprised of separate decoders 216 for decoding each stream of security camera video data 138 and raw video data 260, and raw capture components 250 to accept image data 136. The video mixer subsystem 204 is comprised of one or more mixers 218, and the video encoder subsystem 206 is comprised of one or more encoders 220.

A pipeline is a set of data processing elements connected in series, so that the output of one element is the input of the next element. The transcode and mixing server 128 creates and manages video transcoding pipelines, each comprised of one or more decoders 216 or raw capture components 250, one mixer 218, and one encoder 220. The output of each pipeline is an encoded video data stream 154.

The transcode and mixing server 128 supports real-time transcoding and mixing of video data from security cameras at different frame rates. Within the transcode and mixing server 128, video sources, decoders 216, mixers 218, and encoders 220 operate independently of each other and can support different frame rates. In this way, the frame rate of each stage of the video transcoding pipeline can fluctuate or be changed without affecting the other stages. These stages can utilize shared memory for the output of each stage.

In one example that illustrates independent operation of each stage in the transcode and mixing server 128, video sources continually update the contents of decoders 216, which place the decoded video into decoder shared memory 222. Each mixer 218 independently polls decoder shared memory 222 for the video streams/frames selected by the user, and combines the selected frames to a single composite frame in mixer shared memory 224. Encoders 220 independently poll mixer shared memory 224 as input for creating transcoded video data 154. Note that this flexibility can sometimes cause the system to miss an occasional video data stream sample or provide a duplicate sample, requiring careful selection of update rates for each stage in response to system conditions.

Transcoding is a process that changes the original encoding format of a source file, image data, or video data stream to a different target format. The source is typically first decoded to an intermediate uncompressed format, and then encoded in the desired target format. The decoders 216 and encoders 220 may support different compression formats, and update frequencies (frame rates), in frames per second ("fps"). The mixers 218 also support different frame rates. The video mixer subsystem 204 instructs mixers 218 to combine composite multiple frames at a frame rate independent of the input streams to each mixer 218.

In three-dimensional computer graphics systems that integrate video, the image plane is a portion of computer memory associated with the plane of the monitor or user display device. Each video data and image data stream resides in its own portion of computer memory called video planes and graphics planes, respectively. Manipulation of video and images involves performing operations upon the video planes and graphics planes associated with the video and images, and projecting the result to the image plane for viewing on the monitor or user display. Mixers 218 in the transcode and mixing server 128 function in a similar fashion, in one specific implementation.

Each mixer 218 selects one or more of the decoded video data streams and image data, analogous to video planes and graphics planes in computer graphics, performs operations upon the images/video frames, and outputs a single composite video data stream similar to an image plane in computer graphics. The output of a mixer 218, therefore, is a representation of what will be displayed on the user devices 104, stored in memory.

The video decoder subsystem 202 and video mixer subsystem 204 utilize shared memory 212 to provide buffering of video data and allow access to data between independently executing processes. Shared memory allows independent software processes associated with decoders 216, mixers 218, and encoders 220 to communicate with each other by reading and writing video data independently via shared memory subsystems 212 and 214, though they may operate at different frame rates.

In FIG. 2, the different stages of the video transcoding pipeline such as the video decoder subsystem 202, the video mixer subsystem 204, and the video encoder subsystem 206 are depicted as independent software processes within and executing on the transcode and mixing server 128. Each of these stages/subsystems supports their respective decoder, mixer, and encoder components. However, it is possible for each subsystem to run on completely different hardware systems (e.g. different computers) connected by a network using data communications links. In such a case, the interfaces between the subsystems should operate with very low latency due to the relatively large size of uncompressed (raw) video frames created after the decoding and mixing stages. The "shared" memory between hardware systems is implemented as a file that each computer supporting a stage can access, or a designated memory area that is accessed via the network by using a communications protocol, in two examples. Due to advances in modern software development frameworks, components running on different physical systems can be abstracted to virtually reside and execute in one virtual computer. As a result, the video decoder subsystem 202, video mixer subsystem 204, and the video encoder subsystem 206 and their respective components can be implemented as combinations of hardware and/or software.

The video decoder subsystem 202 decodes each input source as needed using separate decoders 216, and stores each resulting decoded stream/frame into a separate shared memory buffer 222. Each mixer 218 is configured to read from some combination of the shared decoder memory buffers 222 the video data streams selected by the user, resize the video data streams or adjust their color spaces as needed, combine them into a single stream, and then write the resulting combined (or composite) video data stream to a portion of mixer shared memory. Each encoder 220 then reads a single composite video data stream from mixer shared memory and compresses/encodes the stream to create transcoded video data 154.

The transcode and mixing server 128 is further comprised of a decoder mixer shared memory subsystem 212, and a mixer encoder shared memory subsystem 214. The decoder mixer shared memory subsystem 212 is comprised of one or more instances of decoder shared memory 222, and the mixer encoder shared memory subsystem 214 is comprised of one or more instances of mixer shared memory 224. In addition, the video mixer subsystem 204 accepts a configuration control message 150, wherein the video mixer subsystem 204 changes the mixing and transcoding of security camera video data 138 in response to the configuration control message 150. The configuration control message 150 may comprise information about which video data streams have been selected for display, as well as an operation to perform on one or more of the component streams, such as zoom, pan, combine, and/or change camera.

The video decoder subsystem 202 provides an interface for all input sources to the transcode and mixing server 128. Input sources comprise the security camera video data 138, the raw video data 260, and image data 136, but could also include video from Internet Protocol ("IP") cameras, and image data in proprietary or third-party formats. Because each input source has specific characteristics, the video decoder subsystem 202 accepts each input source into a respective decoder 216 and creates a separate instance of decoder shared memory 222 within the decoder mixer shared memory subsystem 212 for buffering and isolation of each input source, in a current implementation. The one-to-one relationship between an input source and a decoder 216 also allows the transcode and mixing server 128 to be extended to handle future video sources and unsupported encodings by today's standards.

According to this embodiment, security camera video data 138 is accepted by the video decoder subsystem 202 and decoded via a separate decoder 216 for each stream of the security camera video data 138. The video decoder subsystem 202 then writes decoded video data 238 for each video data stream into its own instance of decoder shared memory 222. In response to the configuration control message 150, the video mixer subsystem 204 instructs the mixers 218 to combine buffered decoded video data 228 from one or more instances of decoder shared memory 222, i.e., from selected video streams, into mixed video data 232. The video mixer subsystem 202 then writes each mixed (combined) video data 232 to its own instance of mixer shared memory 224. The video encoder subsystem 206 reads the buffered mixed video data 236 for each composite stream of mixed video data 232 into a separate encoder 220, and the video encoder subsystem 206 encodes the buffered mixed video data 236 into transcoded video data 154 for streaming by the video streaming server 134.

In one example of the current embodiment, the transcode and mixing server 128 constructs a video transcoding pipeline using two separate video data input streams from different video sources, encoded in different compression formats and at different frame rates. The transcode and mixing server 128 decodes each input stream using separate decoders, combines the decoded streams into a single mixed stream at a common frame rate, then encodes the single combined stream with a common compression format and frame rate. The example uses specific values to better illustrate the behavior of the transcode and mixing server 128 at each stage during the construction of the video transcoding pipeline.

For this example, the network video recorder 126 accepts two input streams of security camera video data 138. One video data stream was originally encoded using H.264 format at 15-30 fps, and the other video data stream was originally encoded using MPEG4 format at 30 fps. The network video recorder 126 records each video data stream in their native format, and provides the recorded security camera video data 138 to the video decoder subsystem 202. The video decoder subsystem 202 determines the compression format of each stream, and decodes one video data stream using decoder1 216 which decodes using H.264 format at 15-30 fps, and decodes the other stream using decoder2 216 which decodes using MPEG4 format at 30 fps.

The decoder mixer shared memory subsystem 212 then buffers the decoded video data 238 from decoder1 216 and decoder2 216 into their own instances of shared memory, decoder1 shared memory 222 and decoder2 shared memory 222, respectively. This makes buffered decoded video data 228 for each video data stream available to other components in the transcode and mixing server 128, such as mixers 218.

In response to a configuration control message 150 with selected security camera video data 138 and operation combine, the video mixer subsystem 204 instructs mixer1 218 operating at 60 fps to read the buffered decoded video data 228 from decoder1 shared memory 222 and decoder2 shared memory 222. Mixer1 218 combines the contents of the buffered decoded video data 228 from each of the two streams into mixed video data 232, and the video mixer subsystem 202 writes the mixed video data 232 to an instance of mixer shared memory, mixer1 shared memory 224. This makes buffered mixed video data 236 available to other components in the transcode and mixing server 128, such as encoders 220. Finally, the video encoder subsystem 206 reads the buffered mixed video data 236 into a single encoder, encoder1 220, which is using H.264 format at 15 fps. Encoder1 220 compresses the buffered mixed video data 236 at 15 fps intervals using H.264 format, creating a single stream of transcoded video data 154 for streaming by the video streaming server 134. As a result, the transcode and mixing server 128 completes a video transcoding pipeline that combines two separate input video data streams, encoded in different formats and at different frame rates, into a single output transcoded video stream suitable for transmission to a video streaming server 134 for display on user devices 104 such as mobile user devices 106. In a more general sense, each mixer 218 may be able to read and combine video data from any combination of decoder memory instances 222.

Shared memory within the transcode and mixing server 128 can use system memory from the transcode and mixing server 128, or graphics memory from systems such as integrated video capture cards. Video capture cards allow for such display possibilities such as rotation or stretching of the image plane as a virtual rectangular surface, or changing the image plane to a sphere or cylinder, and efficient processing and manipulation of video data, images, and graphics.

Figure 3:
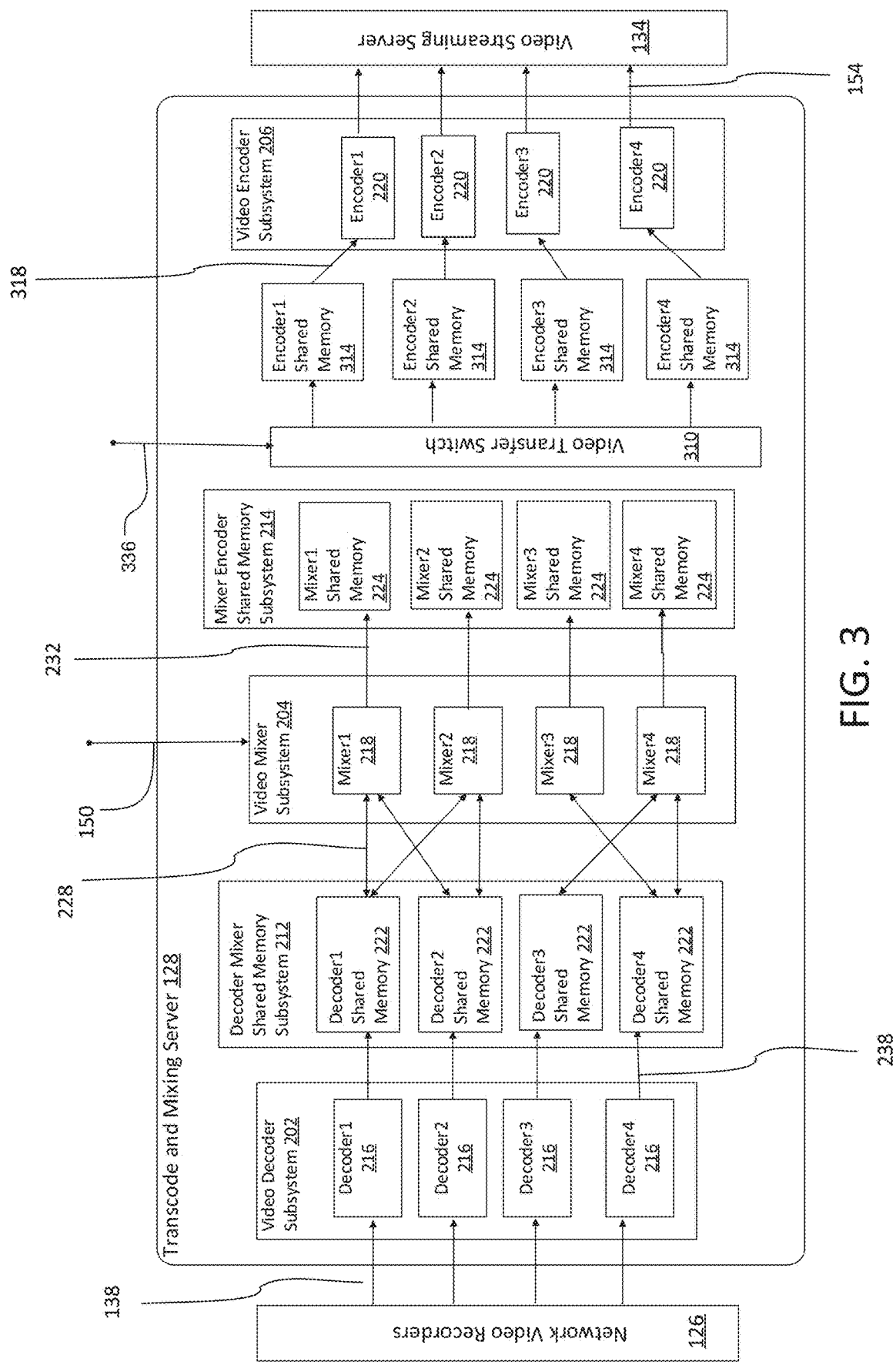
FIG. 3 is a block diagram showing a transcode and mixing server according to another embodiment of the present invention.

FIG. 3 is a block diagram showing the transcode and mixing server 128 according to another embodiment of the present invention. The transcode and mixing server 128 further comprises a video transfer switch 310 which copies the contents of one shared memory buffer to another at a specified interval in response to a video switch control message 336. In one implementation, the video transfer switch 310 is unconstrained by the contents of the shared memory buffer, allowing for "any-to-any" (including one-to-many) copying of shared memory within the transcode and mixing server 128.

The video transfer switch 310 "pulls" or "pushes" raw video frames from one shared memory buffer to another. It has the knowledge of where the source and target buffers are. The switch allows for creation of simplified mixers and encoders that do not need to know where their source shared memory buffers are, whose update logic relies only on the transfer of internal shared memory and not the transfer of raw video samples.

In one example based on FIG. 2, the encoder "pulls" or reads raw video frames from the mixer shared memory buffer to a private buffer within the encoder. In another example based on FIG. 3, the video transfer switch 310 is used in combination with an external encoder shared memory buffer 314. This allows for independence of the encoder and mixer (the encoder does not have to know about the existence of the mixer shared memory buffer in order to use its contents). The video transfer switch 310 has this knowledge and it "pushes" the raw video sample from the mixers or video sources to the encoder's shared memory 314.

For example, the video transfer switch 310 can copy one instance of decoder shared memory 222 to another instance of decoder shared memory, one instance of decoder shared memory 222 to an instance of mixer shared memory 224, or an instance of mixer shared memory 224 to another instance of mixer shared memory 224. In yet another example, the video encoder subsystem 206 creates an instance of encoder shared memory 314 associated with a single encoder 220, and the video transfer switch 310 copies the contents of mixer shared memory 224 to the newly created instance of encoder shared memory 314. This last example provides processing time savings over the creation of a non-switched video transcoding pipeline.

For the example of this embodiment, the transcode and mixing server 128 performs the decoding and mixing stages of a video transcoding pipeline as in the example for the embodiment of FIG. 2, but the video data is prepared for the encoding stage differently. For the encoding stage, in response to a video switch control message 336, the video transfer switch 310 copies the mixer shared memory 224 to an instance of encoder shared memory 314 for each stream of mixed video data 232. The resultant buffered switched video data 318 is available for encoding in real-time by the encoders 220 of the video encoder subsystem 206.

Unlike the FIG. 2 example, where the encoders 220 must first read the mixed video data 232 from an existing shared memory buffer, the encoders 220 in the FIG. 3 example have immediate access to the mixed video data 232 in encoder shared memory 314 and can encode the contents directly. This eliminates the time and resources needed for encoders 220 to read the data out of mixer shared memory before encoding, while adding only the limited overhead of creating extra copies of the video data in shared memory.

Figure 4:
FIG. 4 illustrates an exemplary image of video data displayed on a user device.

FIG. 4 illustrates an exemplary mixed video data image 406 displayed within a view 402 on the user device display 404 of user device 104. Because of the ability of the FIG. 1 transcode and mixing server 128 to transcode and mix multiple video data streams into a single transcoded stream for display, what appears to be a separate overlay video image of four other video data streams in the lower right corner of mixed video data image 406 is actually part of the same mixed video data image 406 within view 402. In one example, the FIG. 2 mixers 218 can combine multiple video data streams into such views as a matrix view or picture-in-picture view, with the ability to overlay image data such as text and graphics over the video.

Figure 5A:
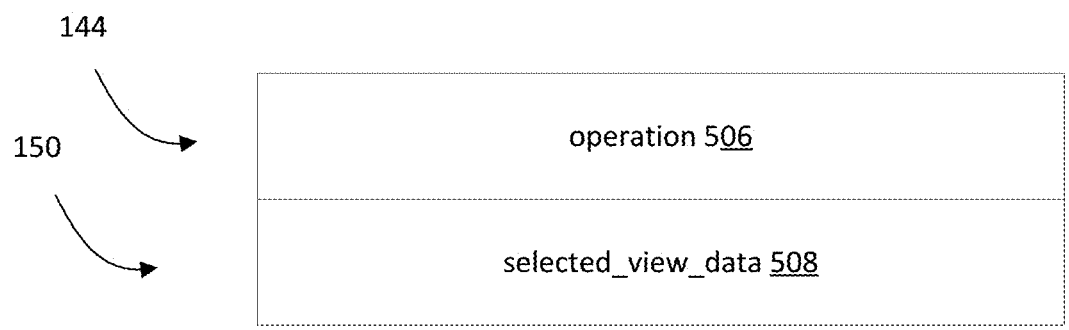
FIG. 5A illustrates one example of an application control message and a configuration control message.

FIG. 5A provides one example of the application control message 144 and configuration control message 150, which includes multiple fields. According to various examples of the present invention, the fields comprise an operation 506 and selected_view_data 508. According to one aspect, the selected_view_data 508 comprises identifiers for panes within a view, or URLs for display streams. Operation 506 comprises information to perform on selected_view_data 508, such as zoom and combine. The FIG. 1 user applications 182 provide the contents of the application control message 144 and the configuration control message 150.

Figure 5B:
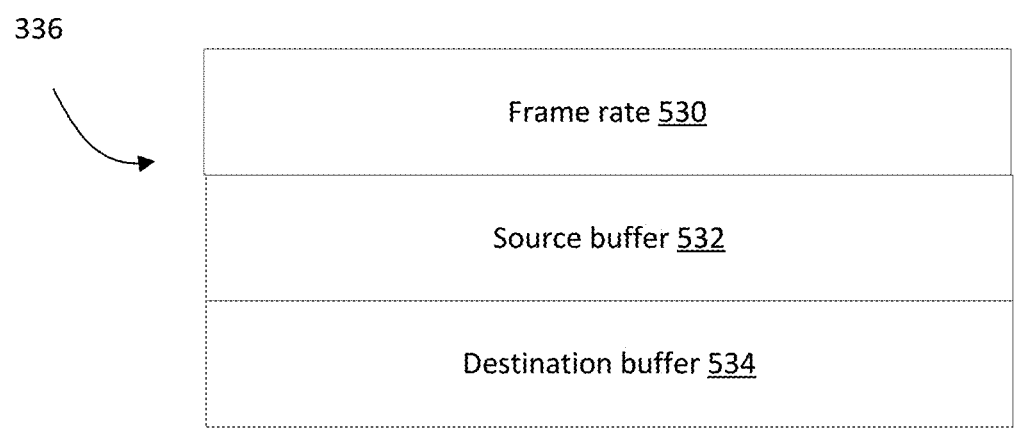
FIG. 5B illustrates one example of a video switch control message.

FIG. 5B provides one example of the video switch control message 336, which includes multiple fields. According to another aspect, the fields include a frame rate 530, a source buffer 532, and a destination buffer 534. The FIG. 1 user applications 182 provide the contents of the video switch control message 336.

Figure 6A:
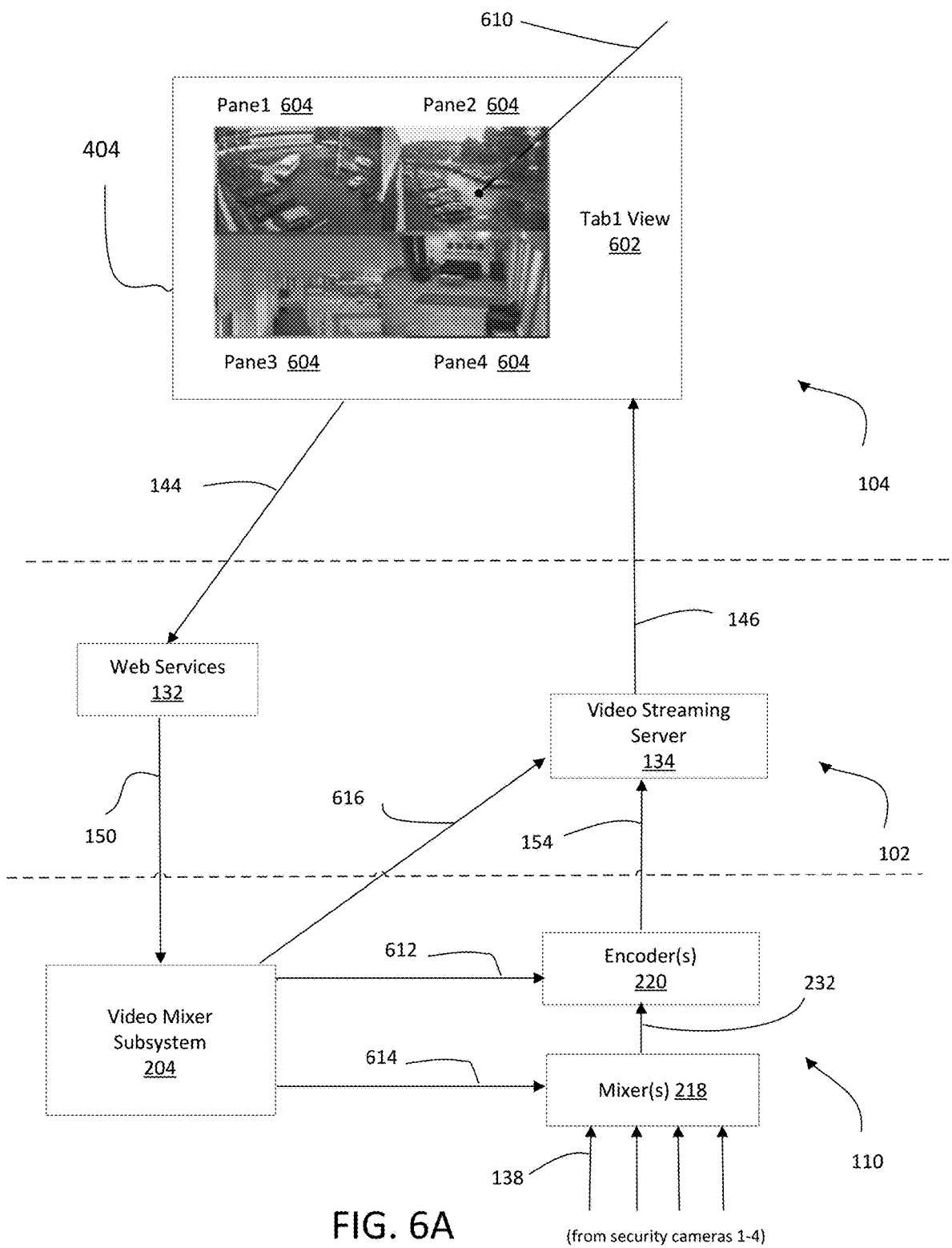
FIG. 6A is an exemplary data flow block diagram showing the video security system receiving security camera video data from four security cameras and displaying the video data stream on a user device, and then receiving a selection of one video data stream and operation zoom on a user device.

FIG. 6A illustrates the high-level data flows in the video security system 100 when the video security system 100 is actively receiving, processing, and displaying video data streams, then receives a selection 610 from the user device 104 to zoom in on one of the streams. Before the selection 610, user device display 404 of user device 104 is displaying video data from four security video cameras in a matrix view of four panes 604 within Tab1 view 602 of user device display 404. Then, the user requests to zoom in on the video data in one of the panes, with the expectation that the security video distribution system 102 will leave the current matrix view of video data undisturbed and create a new view on the user device display 404 containing the zoomed video data. Dashed lines appear in FIG. 6A to separate the boundaries of the user device 104, the security video distribution system 102, and the image processing system 110.

Video mixer subsystem 204 sends mixer_messages 614 instructing the mixers 218 to perform operations such as "combine" and "zoom" on selected video data streams. Video mixer subsystem 204 also sends encoder_messages 612 to encoders 220 comprising such functions as "create," "setup," "start," and "stop." Video mixer subsystem 204 also sends streaming_server_messages 616 to the video streaming server 134 comprising such functions as "start," "stop," and to use standard streaming protocols such as HTTP Live Streaming ("HLS").

In this example, before the selection 610, the image processing system 110 is receiving security camera video data 138 from four security cameras, which the mixers 218 then mix into mixed video data 232. The encoders 220 encode the mixed video data 232 into transcoded video data 154 for streaming by the video streaming server 134 into streaming video data 146. User device 104 displays the streaming video data 146 within Tab 1 view 602 of user device display 404. The security camera video data 138 for security cameras 1-4 display as a matrix view in panes 1-4 604.

After the selection 610, user device 104 sends an application control message 144 to the web services component 132, with the following contents: a FIG. 5A operation 506 with value "zoom," and FIG. 5A selected_view_data 508 with value of pane2 604. to the web services component 132. The web services component 132 sends the configuration control message 150 to the video mixer subsystem 204, with the following contents: a FIG. 5A operation 506 with value "zoom," and the FIG. 5A selected_view_data 508 with value of pane2 604.

Figure 6B:
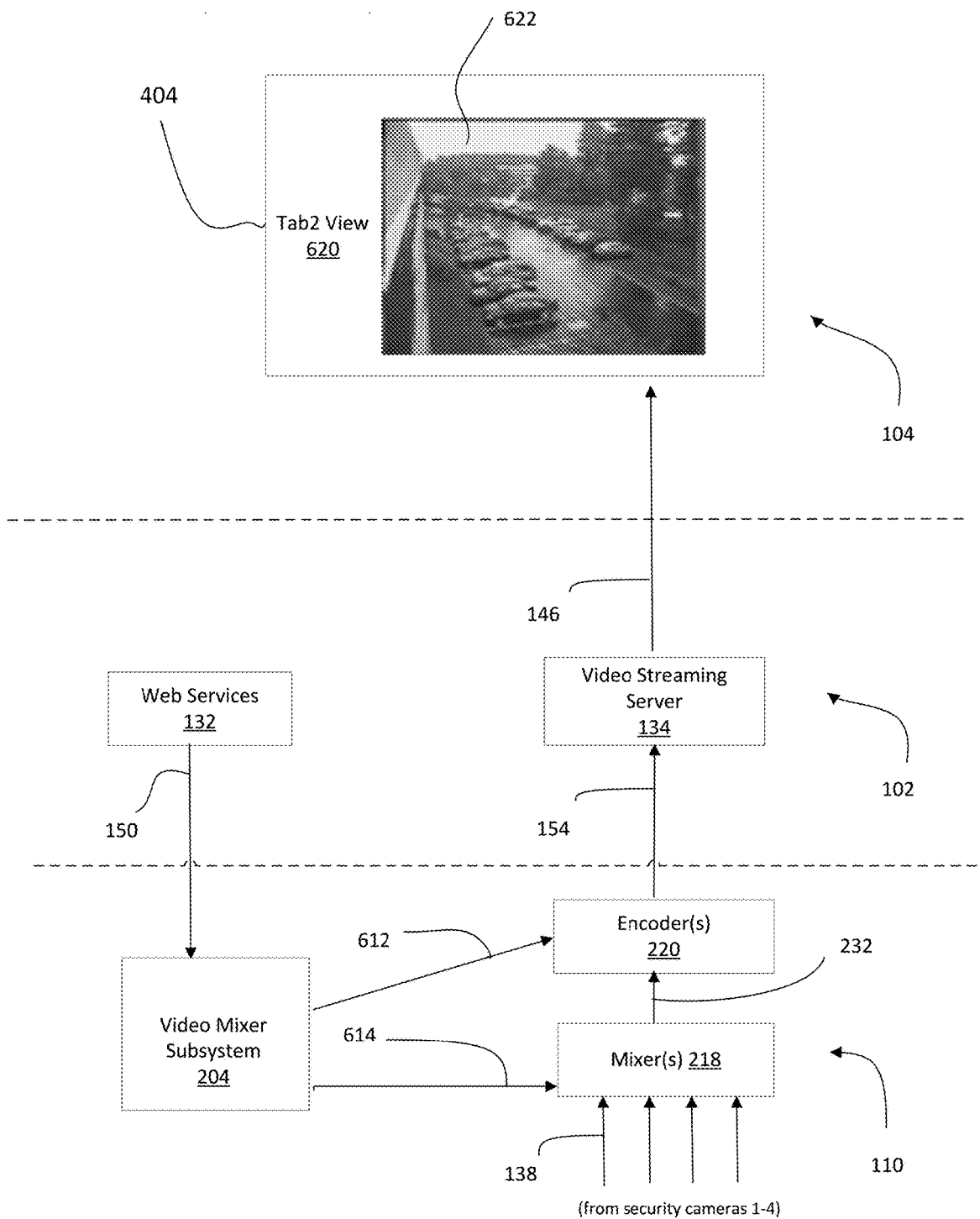
FIG. 6B is an exemplary data flow block diagram showing the displaying of the video data on a user device display in response to the selection in FIG. 6A.

FIG. 6B illustrates the high-level data flows in the video security system 100 in response to the selection in FIG. 6A. Though the video security system 100 continues to accept security camera video data 138 and display it to user device display 404, this example focuses on the newly created view, Tab2 view 620, containing the zoomed video data image 622. Dashed lines appear in FIG. 6B to separate the boundaries of the user device 104, the security video distribution system 102, and the image processing system 110.

The video mixer subsystem 204 receives the configuration control message 150 from the web services component 132. The video mixer subsystem 204, via mixer_messages 614, performs operation zoom on the video data stream for Pane2. The video mixer subsystem 204 then instructs encoder(s) 220, via encoder_messages 612, to encode the mixed video data 232 into transcoded video data 154 for streaming by the video streaming server 134 into streaming video data 146. User device display 104 displays the streaming video data 146 in tab2 view 620 of user device display 404 as the zoomed video data image 622.

In this example, no new streams were created for the zoomed video data image 622, and the only thing that has changed in the image processing system 110 between FIG. 6A and FIG. 6B is the contents of the mixer(s) 218. Moreover, nothing has changed with the mixer 218 contents between FIG. 6A and FIG. 6B other than the mixer zoomed in on a particular region of video.

With respect to the earlier analogy for three-dimensional graphics systems, mixer 218 maintains different memory spaces for each of the FIG. 6A four panes 604 of Tab1 view 602, positioned next to each other so as to form a full-view virtual singular rectangular surface. Using the analogy of a mixer 218 as a virtual video camera that focuses on different regions of mixer memory, the mixer 218 projects this virtual rectangular surface onto the image plane in mixer 218 memory, resulting in the single four-pane image in FIG. 6A Tab1 view 602.

To perform the zoom operation, the FIG. 6B mixer 218 moves its virtual video camera closer and to the upper-right of the FIG. 6A Tab1 view 602 until the image of Pane2 604 fills the virtual video camera's view, displayed on user device 104 as the zoomed video data image 622.

Figure 7A:
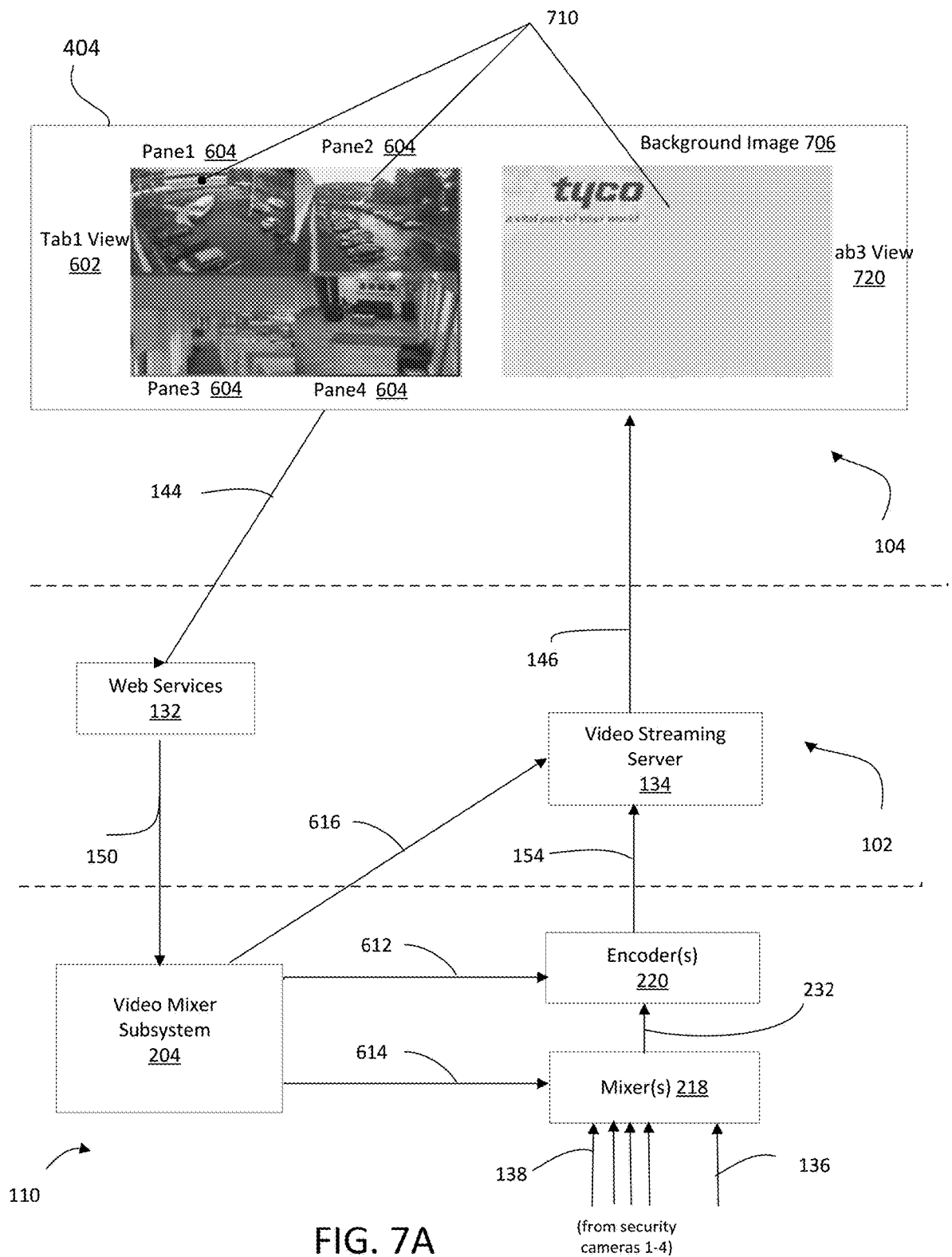
FIG. 7A is an exemplary data flow block diagram showing the security system receiving security camera video data from four security cameras and displaying the video data on a user device, and then receiving a selection of two video data streams and image data and operation combine on a user device.

FIG. 7A illustrates the high-level data flows in the video security system when the system is actively receiving, processing, and displaying video data from four security video cameras, and then receives a selection of two video streams from the displayed video data and a background image 706, with operation combine from a user device. Before the selection 710, user device display 404 of user device 104 is displaying video data from four security video cameras in a matrix view of four panes 604 within Tab1 view 602 of user device display 404. Then, the user requests to combine video data from two of the panes with the background image, with the expectation that the security video distribution system 102 will leave the current matrix view of video data undisturbed and create a new view on the user device display containing the combined video data. Dashed lines appear in FIG. 7A to separate the boundaries of the user device 104, the security video distribution system 102, and the image processing system 110.

In this example, before the selection 710, the image processing system 110 is receiving security camera video data 138 from four security cameras, which the mixers 218 then mix into mixed video data 232. The encoders 220 encode the mixed video data 232 into transcoded video data 154 for streaming by the video streaming server 134 into streaming video data 146. User device 104 displays the streaming video data 146 within Tab1 view 602 of user device display 404. The security camera video data 138 for security cameras 1-4 display as a matrix view in panes 1-4 604.

After the selection 710, user device 104 sends an application control message 144 to the web services component 132, with the following contents: a FIG. 5A operation 506 with value "combine," and FIG. 5A selected_view_data 508 with value pane1 604 and pane2 604, background image 706 to the web services component 132. The web services component 132 sends a configuration control message 150 to the video mixer subsystem 204, with the following contents: a FIG. 5A operation 506 with value "combine," and a FIG. 5A selected_view_data 508 with the value of pane1 604, pane2 604, and image data 704.

Figure 7B:
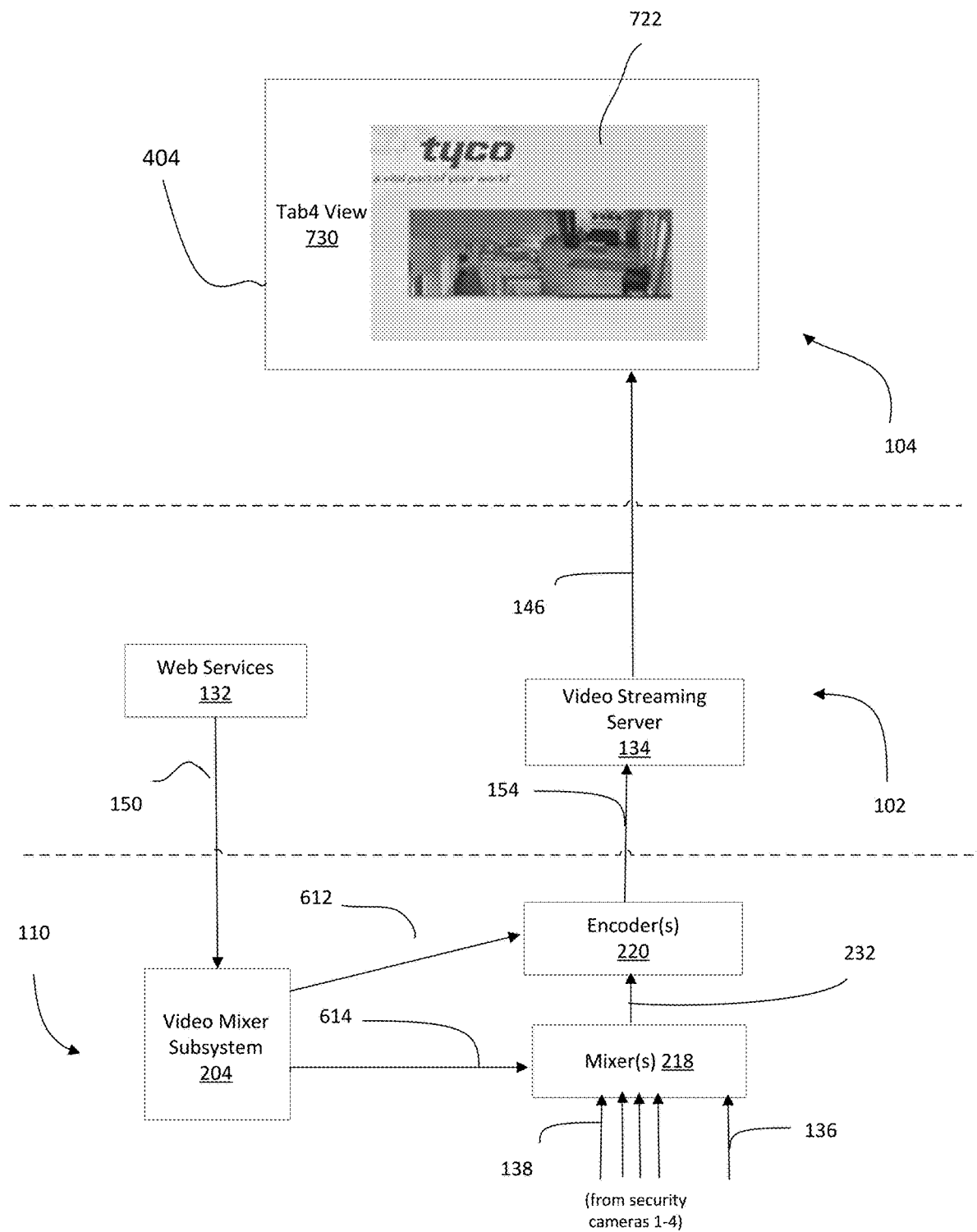
FIG. 7B is an exemplary data flow block diagram showing the displaying of the video data and image data on a user device display in response to the selection in FIG. 7A.

FIG. 7B illustrates the high-level data flows in the video security system in response to the selection in FIG. 7A. Though the video security system continues to accept security camera video data 158 and display it to user device display 404, this example focuses on the newly created view, Tab4 view 730, containing the combined video data image 722. Dashed lines appear in FIG. 7B to separate the boundaries of the user device 104, the security video distribution system 102, and the image processing system 110.

The video mixer subsystem 204 receives the configuration control message 150 from the web services component 132. The video mixer subsystem 204, via mixer_messages 614, performs operation combine upon the video data streams for Pane1 604, Pane2 604, and image data 136 associated with the FIG. 7A background image 706. The video mixer subsystem 204 then instructs encoder(s) 220, via encoder_messages 612, to encode the mixed video data 232 into transcoded video data 154 for streaming by the video streaming server 134 into streaming video data 146. User device display 104 displays the streaming video data 146 in tab4 view 730 of user device display 404 as the combined video data image 722.

In this example, no new streams were created for the combined video data image 722, and the only thing that has changed in the image processing system 110 between FIG. 7A and FIG. 7B is the contents of the mixer(s) 218.

With respect to the earlier analogy for three-dimensional graphics systems, mixer 218 maintains different memory spaces for each of the FIG. 7A four panes 604 of Tab1 view 602, positioned next to each other so as to form a full-view virtual singular rectangular surface. The FIG. 7B background image 706 also has its own graphics plane or memory space, positioned behind the other image planes. The background image 706 fills its memory space within the mixer 218. Using the analogy of a mixer 218 as a virtual video camera that focuses on different regions of mixer memory, in response to the combine operation upon selection 710, the mixer 218 first hides or makes invisible the non-selected memory spaces for FIG. 7A pane3 604 and pane4 604. Then, the mixer 218 moves the memory spaces for FIG. 7A pane1 604 and pane2 604 to the center of the image plane, resulting in the FIG. 7B combined video data image 722.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security video distribution system for a video security system, comprising:
    an image processing system that performs transcoding and mixing of video data from security cameras, the image processing system including a video decoder subsystem that decodes security camera video data from the security cameras and a video mixer subsystem that mixes the decoded video data into the mixed video data that includes video data from one or more of the security cameras; and
    an application support system that streams the mixed video data to user devices, wherein the application support system enables selection of the streaming video data at the user devices, the image processing system changing the mixing of the mixed video data in response to the selection, the application support system enabling selection of the streaming video data at the user devices, the video mixer subsystem of the image processing system mixing decoded video data from different security cameras in response to the selection,
    wherein the decoder subsystem includes a bank of decoders and the video mixer subsystem includes a bank of mixers, wherein each of the decoders places decoded video data into decoder memory and each mixer independently polls decoder memory for decoded video data selected by a user of the at least one user device.

2. The security video distribution system of claim 1, wherein the image processing system further performs transcoding of the mixed video data, and mixes separate video data streams from multiple video cameras into the mixed video data which is a single stream such that frames from multiple video cameras are combined into a single composite frame of the mixed video data, and wherein the image processing system further comprises a video encoder subsystem that encodes the mixed video data into encoded mixed video data for streaming to the at least one user device.

3. The security video distribution system of claim 1, wherein a network video recorder receives the video data from the security cameras and provides the video data to the image processing system.

4. The security video distribution system of claim 1, wherein the application support system comprises:
    a web services component that receives messages from the at least one user device for the selection of the streaming video data and an operation to perform on the selected video data; and
    a video streaming server that receives encoded mixed video data from the video encoder subsystem for streaming to the at least one user device.

5. The security video distribution system of claim 4, wherein the operation to perform on the selected video data is one of: zoom and combine.

6. The security video distribution system of claim 1, further comprising a decoder mixer shared memory subsystem for buffering the decoded video data from the bank of decoders of the video decoder subsystem for the bank of mixers.

7. The security video distribution system of claim 6, further comprising a video transfer switch for copying one instance of buffered decoded video data from the decoder mixer shared memory subsystem to another instance of buffered decoded video data.

8. The security video distribution system of claim 7, further comprising a mixer encoder shared memory subsystem for buffering the mixed video data from the mixers of the video mixer subsystem for the video encoder subsystem.

9. A security video distribution method for a video security system, comprising:
   decoding video data from one or more security cameras;
   mixing the decoded video data to form mixed video data;
   transcoding the mixed video data;
   streaming the mixed video data for display by at least one user device;
   in response to a selection from the displayed video data streams using the at least one user device, changing the mixing of the decoded video data by mixing decoded video data from different security cameras; and
   decoding the video data using a bank of decoders and mixing the decoded video data using a bank of mixers, wherein each of the decoders places decoded video data into decoder memory and each mixer independently polls decoder memory for decoded video data selected by a user of the at least one user device.

10. The security video distribution method of claim 9, further comprising:
    receiving messages from the at least one user device for the selection of the streaming video data and an operation to perform on the selected video data; and
    providing encoded mixed video data for streaming to the at least one user device.

11. The security video distribution method of claim 10, wherein the operation to perform on the selected video data is one of: zoom and combine.

12. A security video distribution method for a video security system, comprising:
    decoding video data from one or more security cameras;
    mixing the decoded video data to form mixed video data;
    transcoding the mixed video data;
    streaming the mixed video data for display by at least one user device;
    in response to a selection from the displayed video data streams using the at least one user device, changing the mixing of the decoded video data by mixing decoded video data from different security cameras; and
    prior to mixing the decoded video data, buffering the decoded video data in a first shared memory that is shared by at least one decoder and at least one mixer.

13. The security video distribution method of claim 12, further comprising:
    copying one instance of the buffered decoded video data in the first shared memory to another instance of buffered decoded video data using a video transfer switch.

14. The security video distribution method of claim 13, further comprising:
    prior to encoding the mixed video data, buffering the mixed video data in a second shared memory that is shared by the at least one mixer and at least one encoder.

15. The security video distribution method of claim 14, further comprising:
    copying one instance of buffered mixed video data to another instance of buffered mixed video data using a video transfer switch.

16. A transcode and mixing server for a security video distribution system, comprising:
    a video decoder subsystem that decodes video data from one or more security cameras into decoded video data using a bank of decoders;
    a video mixer subsystem that mixes the decoded video data using a bank of mixers to form mixed video data; and
    a video encoder subsystem that encodes the mixed video data into encoded mixed video data for streaming to at least one user device for display;
    wherein, based on a selection from the displayed video data streams using the at least one user device, mixing of the decoded video data is changed by mixing decoded video data from different security cameras.

17. The transcode and mixing server of claim 16, further comprising a decoder mixer shared memory subsystem for buffering the decoded video data from the decoders of the video decoder subsystem for the video mixer subsystem; wherein each of the decoders places decoded video data into memory of the decoder mixer shared memory subsystem and each mixer independently polls the memory of the decoder mixer shared memory subsystem for decoded video data selected by the user.

18. The transcode and mixing server of claim 16, further comprising a decoder mixer shared memory subsystem for buffering the decoded video data from the decoders of the video decoder subsystem for the video mixer subsystem; a mixer encoder shared memory subsystem for buffering the mixed video data from the mixers of the video mixer subsystem for the video encoder subsystem; and a video transfer switch for copying decoded video data for multiple user devices.

* * * * *